United States Patent [19]
Vink et al.

[11] Patent Number: 5,178,350
[45] Date of Patent: Jan. 12, 1993

[54] MOUNTING FRAME FOR GANGED ELECTRICAL DEVICES

[75] Inventors: Timothy Vink, Allentown; Robert F. Burkholder, Emmaus; Michael J. D'Aleo, Erwinna; Andrew Elsbury, Allentown, all of Pa.; Woodie Flowers, Weston, Mass.; Richard Lordo; Shawn R. McCall, both of Allentown, Pa.

[73] Assignee: Lutron Electronics CO., Inc., Coopersburg, Pa.

[21] Appl. No.: 625,283

[22] Filed: Dec. 10, 1990

Related U.S. Application Data

[62] Division of Ser. No. 305,883, Feb. 2, 1989, Pat. No. 4,998,635.

[51] Int. Cl.$^5$ .............................................. G12B 9/00
[52] U.S. Cl. .................................. 248/27.1; 220/3.4; 220/3.5; 220/3.8; 220/3.9; 248/544; 248/906
[58] Field of Search ............... 248/27.1, 906, 542, 248/544; 220/3.3-3.5, 3.7, 3.8, 3.9, 3.94; 174/53, 54, 57

[56] References Cited

U.S. PATENT DOCUMENTS

| | | | |
|---|---|---|---|
| 1,113,092 | 10/1914 | Beugler | 174/53 |
| 1,722,430 | 7/1929 | Kelly | 220/3.7 |
| 2,772,062 | 11/1956 | Bowser | 248/27.1 |
| 2,788,187 | 4/1957 | Cookson | 248/27.1 |
| 2,889,437 | 6/1959 | Christensen | 200/168 |
| 2,987,211 | 6/1961 | Rudolph | 220/3.8 |
| 2,989,206 | 6/1961 | McAfee | 220/3.7 |
| 3,437,738 | 4/1969 | Wagner | 174/57 |
| 4,135,337 | 1/1979 | Medlin | 220/3.3 |
| 4,569,458 | 2/1986 | Horsley | 248/27.1 |
| 4,733,330 | 3/1988 | Tanaka | 220/3.8 |
| 4,998,635 | 3/1991 | Vink et al. | 248/27.1 X |

OTHER PUBLICATIONS

Halo Lighting Catalog, p. 72; published in 1987.
Graybar Catalog, pp. 4-24; published in 1986.
Crabtree Catalog—Publication No. AB1710, p. 51; published in 1988.
MK Catalog—MK Product Range 1988-90, p. 69, published in 1988.

*Primary Examiner*—Ramon O. Ramirez
*Attorney, Agent, or Firm*—Seidel, Gonda, Lavorgna & Monaco

[57] ABSTRACT

A mounting frame facilitates the installation of ganged electrical devices into a single switchbox. The frame is a rectangular plate with a rectangular opening and provides a rigid support for the devices. Support is needed when the wall on which the devices are to be mounted is not planar or when the switchbox is not properly mounted into the wall. The frame can also include markings that help to align the devices to permit a multigang faceplate to snap onto the devices. An alignment frame provides markings to help align the devices, without also providing a rigid support.

1 Claim, 6 Drawing Sheets

MOUNTING FRAME FOR GANGED ELECTRICAL DEVICES

This is a divisional of copending application Ser. No. 07/305,883 filed on Feb. 2, 1989; now U.S. Pat. No. 4,998,635.

BACKGROUND OF THE INVENTION

1. Field of the Invention

This invention relates to the mounting of ganged electrical devices into switchboxes, more specifically, it relates to a frame that facilitates such mounting.

2. Description of the Related Art

The wall switches, dimmers, and other electrical devices that are commonly installed in residences and other types of buildings are generally mounted in switchboxes (sometimes called "wallboxes" or "outlet boxes") that are located inside the walls (i.e., behind the wallboard and between the studs). The switchboxes provide the space within which the device is electrically connected to the building wiring that carries power from a central electrical panel. Switchboxes come in a standard size that accommodates a single device and that has removable side panels. These boxes can be joined together, with side panels removed, to accommodate several devices mounted ("ganged") side-by-side. Alternatively, ready-made switchboxes are available to accommodate 2, 3, 4, or more devices. Typically, an electrical device, after being mounted in a switchbox, is covered by a faceplate, which covers the opening in the wall while permitting access to the actuator (e.g., toggle switch) for the device. When more than one device is ganged in a "multigang" switchbox, a single multigang faceplate-having the appropriate access openings appropriately spaced-can cover all the devices.

Standardization plays a key role in facilitating the installation of electrical devices into switchboxes. Switchboxes generally have tapped mounting holes positioned to line up with vertically-spaced holes in the support plates (or "yokes") of the electrical devices. Generally, the yokes also have vertically-spaced tapped mounting holes positioned to line up with holes in the faceplates. Thus, one manufacturer's faceplate readily mounts onto the yoke of a second manufacturer's device, which is installed into a third manufacturer's switchbox.

An attractive appearance is provided when a faceplate surface is unbroken by a screw head; i.e., when the faceplate snaps onto the yoke, or other part, of the electrical device. The snap-on feature depends on the mating elements of the device and faceplate being aligned within rather close tolerances. Unless the elements are aligned in both a lateral (side-to-side) and "in-and-out" (i.e., normal to the wall) direction, it will be impossible to achieve a tight snap fit. When a multigang plate is to snap onto a series of ganged devices, the alignment problem is magnified. If the wall into which a group of devices is mounted is uneven or if certain errors (discussed below) were made in mounting a multigang switchbox into the wall, it may become very difficult or impossible to engage all the snap-on elements on the back-side of the multigang faceplate with the corresponding elements on the devices. If touch switches are among the multigang devices, the in-and-out spacing constraint is particularly severe, since the switch actuator must neither be "bottomed out," in constant close contact with the internal pushbutton mechanism, nor spaced too far from the mechanism to permit the switch to be operated.

Some multigang switchboxes do not have tapped mounting holes to line up with mounting holes in the yokes of all the electrical devices that the switchbox is designed to accommodate. Instead, these boxes have mounting holes only at two ends, and frames have been designed to provide the additional mounting holes. These frames have holes that are positioned to line up with the mounting holes at each end of the switchbox and, in addition, they provide mounting holes positioned to line up with holes in the yokes of a series of side-by-side devices. Among the sources for these frames is Graybar Electric Co., of Clayton, MO.

An arrangement designed to facilitate multigang mounting of switches was disclosed in U.S. Pat. No. 2,889,437, issued Jun. 2, 1959, to Christensen. The switches disclosed by Christensen are mounted on yokes that have an "upset" portion that overlaps a portion of the yoke of an adjoining switch and, at the same time, helps to align and locate the switches.

When the surface upon which an electrical device is to be mounted is a ceiling, rather than a wall, the problems caused by an improperly prepared surface has been addressed in the context of mounting light fixtures, particularly recessed lighting. These fixtures are typically mounted within annular "trim rings" that surround the opening that is cut in the ceiling to accommodate the fixture. When the ceiling opening is cut too large, an "oversize" trim ring is used. The oversized ring has the same inside (cut-out) diameter, to accommodate the fixture, but has a larger outside diameter, to conceal the oversized ceiling opening.

SUMMARY OF THE INVENTION

In accordance with the present invention, a frame for mounting a plurality of adjacent electrical devices into a switchbox comprises a substantially rectangular first plate, having:
a) a front surface,
b) a back surface,
c) a substantially rectangular opening and
d) a plurality of holes positioned to permit alignment with holes in said switchbox.

In a second embodiment of the present invention, a frame for mounting a plurality of adjacent electrical devices into a switchbox comprises, in combination:
a) a substantially rectangular first plate, having a front surface, a back surface, and a substantially rectangular opening and
b) a flange extending substantially normal to said plate at an outer edge of said plate.

In a third embodiment of the present invention, a frame for mounting a plurality of adjacent electrical devices into a switchbox comprises a substantially rectangular first plate, having:
a) a front surface,
b) a back surface,
c) a substantially rectangular opening,
d) a first plurality of holes for mounting said devices to said frame, and
e) a second plurality of holes positioned to permit alignment with holes in said switchbox.

The frame of the present invention greatly simplifies the installation of multigang electrical devices into switchboxes. In each case, by providing a planar mounting surface, the problems caused by uneven walls and improperly mounted switchboxes are greatly reduced. In addition, the frame facilitates alignment of the devices.

An alignment frame is another embodiment of the present invention. The frame facilitates mounting a plurality of adjacent electrical devices into a switchbox and comprises a substantially rectangular plate for mounting between said devices and said switchbox, said plate having
a) a substantially rectangular opening and
b) a surface having spaced alignment markers for positioning said devices in juxtaposition.

DETAILED DESCRIPTION OF THE INVENTION

The present invention provides a frame that facilitates multigang installations, particularly when the wall into which the devices are being installed is uneven, or when the switchbox into which the devices are being installed is not mounted properly (as discussed below) within the wall. The frame is particularly helpful when the multigang installation is covered by a single snap-on faceplate, which is to engage each of the devices.

Figure 1:
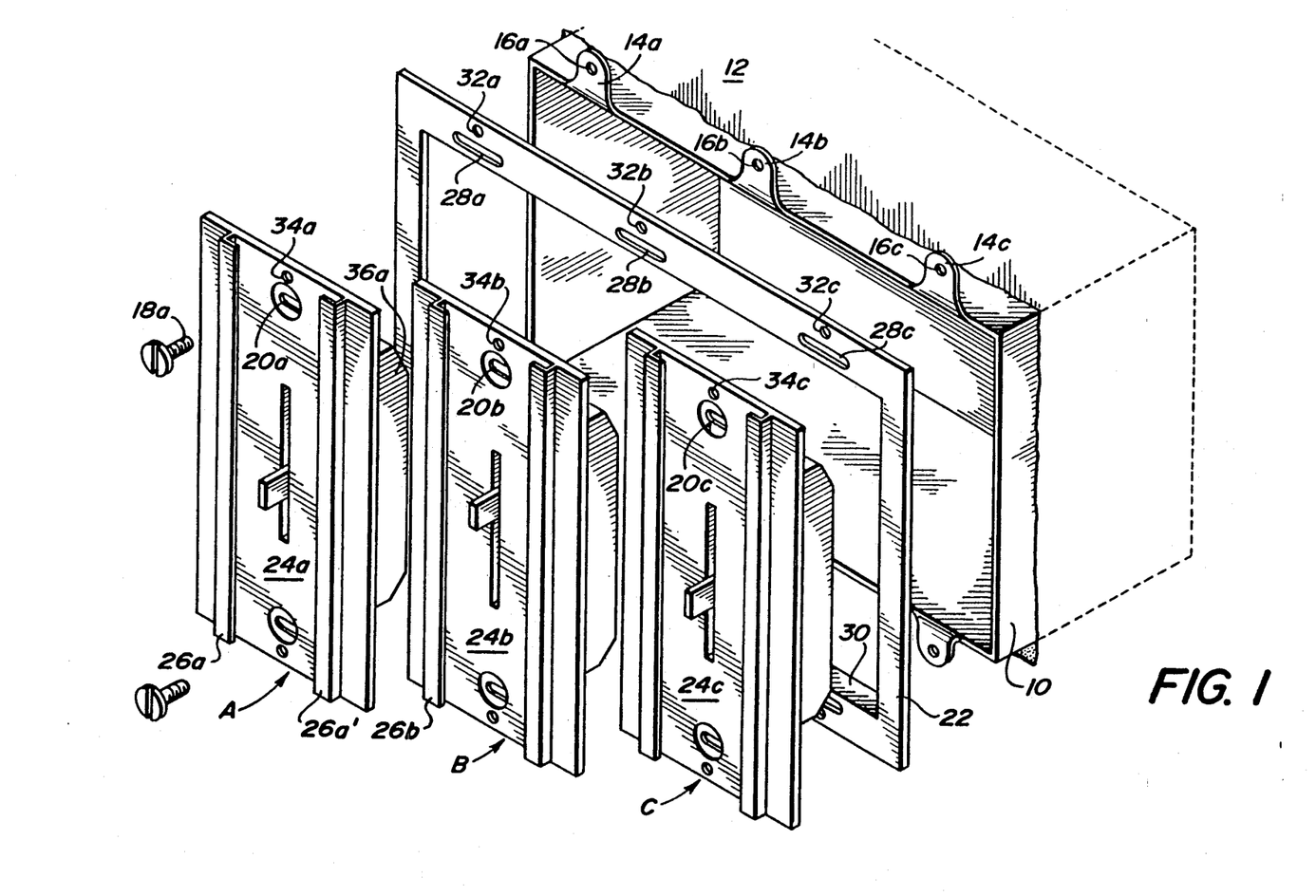
FIG. 1 is an exploded perspective view that depicts an embodiment of the present invention.

FIG. 1 is an exploded view of a multigang installation. Multigang switchbox 10 is mounted into wall 12 and, as shown, accommodates three electrical devices. Tabs 14a, 14b, and 14c have tapped holes 16a, 16b, and 16c that accept screws, such as 18a, for mounting devices A, B, and C, respectively, to switchbox 10. The mounting screws pass through slots 20a, 20b, and 20c, which permit slight lateral motion of the devices, relative to switchbox 10, before they are secured. (For brevity, we refer only to holes, screws, and slots at the top of the elements, although there are corresponding holes, screws, and slots at the bottom of the elements, as well.)

In an ideal situation, wall 12 has a smooth planar surface and switchbox 10 is properly mounted into the wall. In that case, adapter frame 22 is generally not essential, because yokes 24a, 24b, and 24c can be mounted so that their front surfaces are coplanar and because slots 20a, 20b, and 20c permit whatever lateral movement is needed to align mounting elements 26a, 26a', 26b, etc. with corresponding snaps on the back side of a snap-on facelate (not shown). In those cases, an alignment frame (discussed later) can be very helpful in reducing the time and effort required to mount the devices.

In a non-ideal situation, wall 12 may not be planar or switchbox 10 may not be properly mounted into it. In those cases, in the absence of frame 22, the yoke surfaces are not coplanar when the devices are tightly mounted into the box. "Improper" switchbox mounting can occur in various ways. If the switchbox is not rigidly mounted within the wall, then tightening the mounting screws for one of the devices could cause the front of the box to be drawn forward beyond the front surface of wall 12. Alternatively, if the switchbox is rigidly mounted, with its front surface recessed within the hole in the wall, and if the separation of the top and bottom edges of the hole are greater than the height of the yokes, then tightening the mounting screws can draw the center yoke 24b into the hole in wall 12. Even if wall 12 is initially planar, if the front surface of the switchbox is recessed within the hole in the wall, tightening the mounting screws can cause wall 12 to deform.

For these "non-ideal" situations, adapter frame 22 provides a rigid planar surface for supporting devices A, B, and C, with the mounting screws simply passing through slots 28a, 28b, and 28c, respectively. Optional flange 30 provides additional rigidity, extending along the top and bottom inside edges of frame 22 or, alternatively, along all four edges. The flange extends into switchbox 10 when frame 22 is mounted. As the width of flange 30 is made larger, to provide greater rigidity, the flange extends further into switchbox 10, and it may be necessary to provide cutouts on the flange edge to accommodate any protrusions from the switchbox wall. Note that in certain situations it is necessary to install multigang devices into two adjoining switchboxes. In those situations, flange 30 must have cutouts to accommodate the two additional switchbox side panels. For purposes of this specification and the appended claims, two adjoining switchboxes for a single multigang installation will be considered a special case of a single switchbox.

In addition to providing a rigid planar mounting surface, frame 22 optionally provides alignment markers 32a, 32b, and 32c, which are aligned with holes 34a, 34b, and 34c to provide simple and accurate placement of the devices. (Yokes commonly include tapped holes 34a, 34b, and 34c to permit "tamper-proof" mounting of faceplates to the yokes, but the holes are otherwise not used.) Alignment markers 32a, 32b, and 32c may be small marks on the frame or may be protuberances that protrude from its front surface.

As shown in FIG. 1, alignment markers (such as 32a) are all located over frame slots (such as 28a); however, that is not always the case. The markers are all regularly spaced, as shown. However, in some cases—e.g., when different sized yokes are included among the devices being ganged—the devices are mounted using off-center mounting holes (not shown) in the yokes. In those cases, the slots in the frame need only line up with the holes in the yokes that are actually used for mounting, and there may be fewer slots in the frame. Of course, each slot (such as 28a) must line up with a tapped hole (such as 16a) in switchbox 10.

Aesthetics will generally suggest a minimum thickness for frame 22, so that that frame minimally affects the appearance of the multigang installation. Since, at the same time, it is important that frame 22 be rigid, steel is a preferred material of construction. (When reference is made to "steel" in this specification and the appended claims, the term is meant to include the broad variety of steels, including stainless steel.) The optimum material will be selected by balancing the importance of factors such as resistance to rust and corrosion, rigidity, modulus of elasticity, yield strength, machinability (or formability), and cost. To provide suitable rigidity, frame thickness is preferably at least about 2 mm in the absence of flange 30 or, if flange 30 is used, at least about 0.5 mm. If the frame is too thick, it becomes difficult to bend flange 30 from an initially flat plate. Also, if flange 30 is provided by bending the frame material, then the frame thickness is limited by the clearance between the top and bottom of the device backboxes (such as 36a) and the inside top and bottom of switchbox 10. For standard-sized backboxes and switchboxes, it is impractical to have the thickness of flange 30 exceed about 0.7 mm.

Figure 1A:
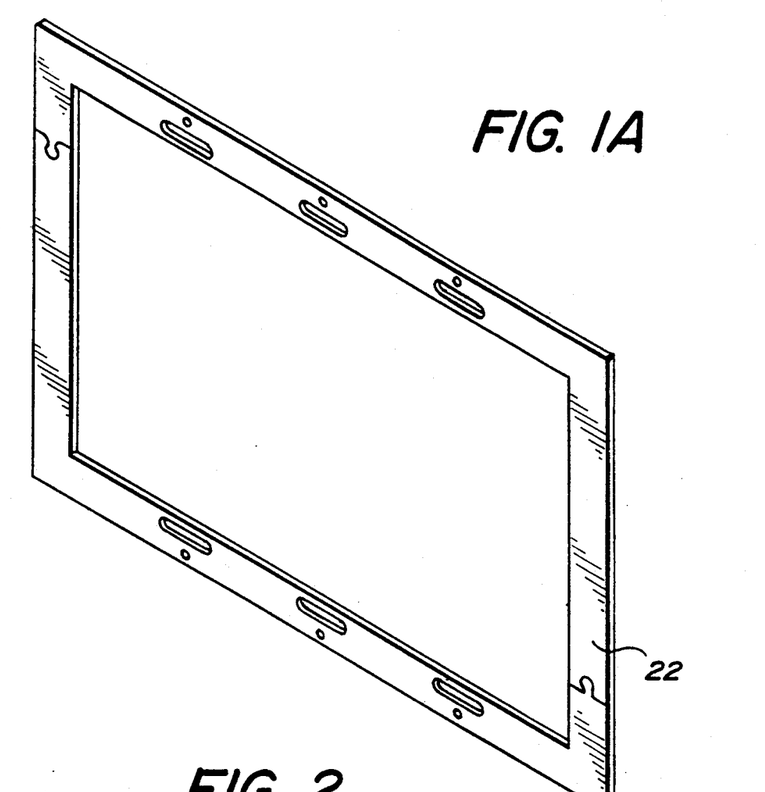
FIG. 1A depicts an alternative embodiment of the frame of FIG. 1.

When flange 30 is not used, frame 22 may be formed from two interlocking pieces, as exemplified in FIG. 1A. Although the pieces shown in FIG. 1A are each in the shape of an "L," it is clear that there are many alternative shapes, as well. An advantage of the structure of FIG. 1A is that the pieces may be put in place first and then interlocked, thus permitting their installation after the wiring is in place.

Figure 2:
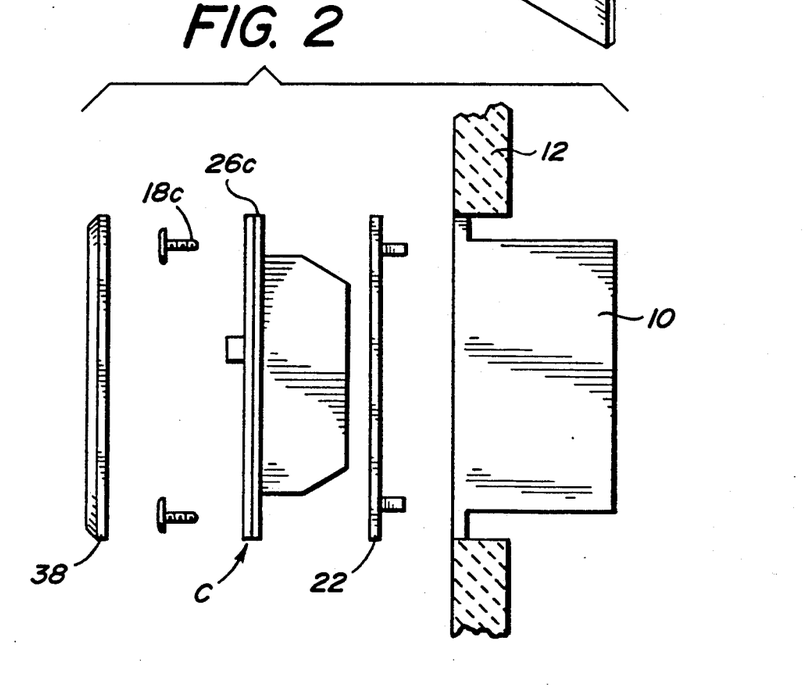
FIG. 2 is a side view of the invention of FIG. 1.

FIG. 2 is a side view, with wall 12 in cross section, of the elements shown in FIG. 1 and, in addition, faceplate 38. The faceplate has snaps (not shown) that connect with mounting elements, such as 26c, for mounting.

In certain situations, when the non-planarity of the wall is particularly severe, or when the switchbox mounting in the wall is particularly egregious, providing a planar surface that permits the devices to be mounted tightly to the switchbox may require a mounting frame that has greater rigidity than is provided by frame 22. Such a structure is depicted in FIG. 3.

Figure 3:
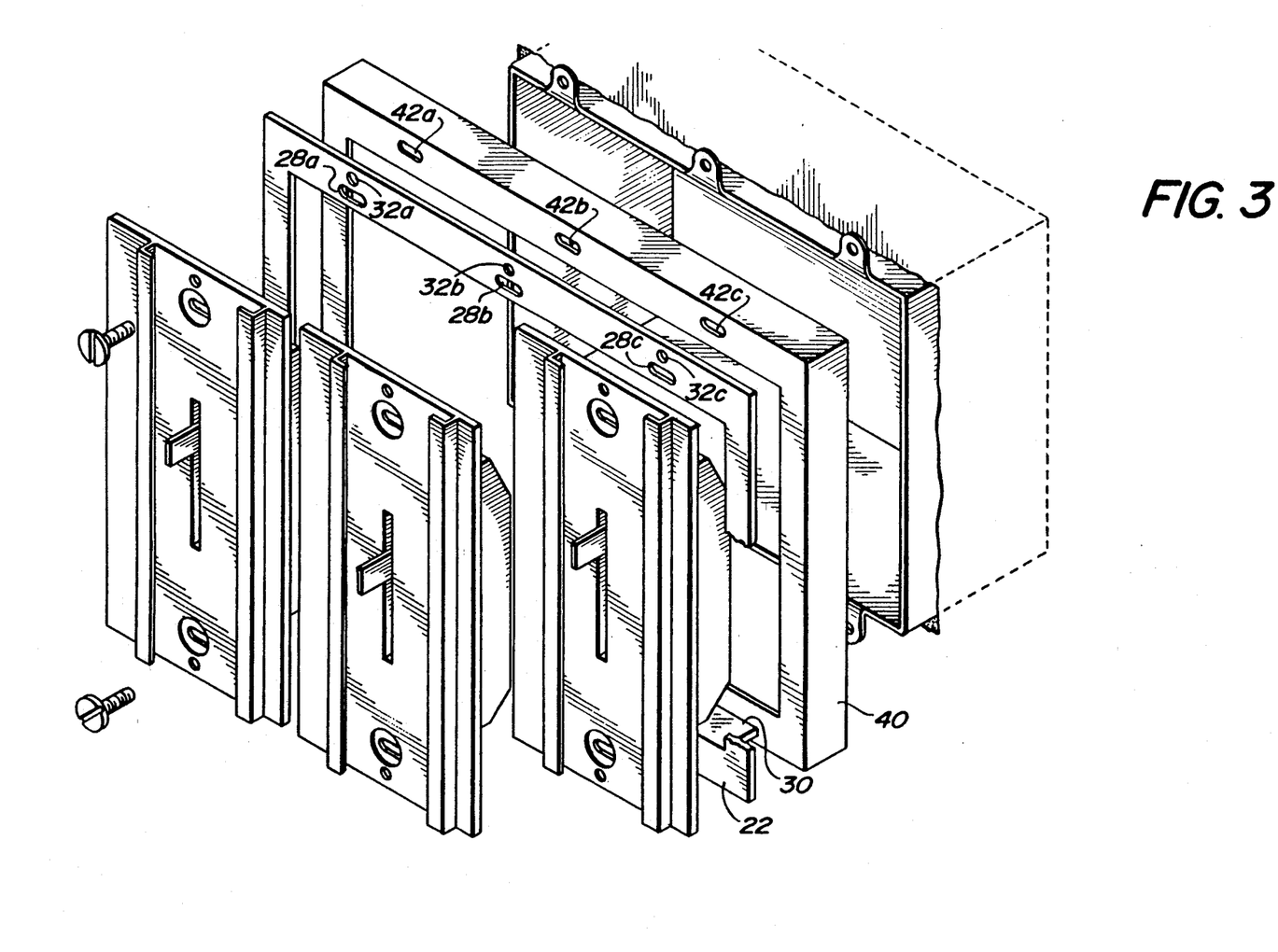
FIG. 3 is an exploded perspective view of another embodiment of this invention.

FIG. 3 depicts the elements of FIG. 1 and, in addition, strengthening bracket 40. Bracket 40 has a shape and size that is similar to that of frame 22, except that it need not have a flange 30 or alignment markers 32a, 32b, and 32c. For mounting, slots 42a, 42b, and 42c are aligned with slots 28a, 28b, and 28c, respectively, in frame 22. When the devices are mounted, flange 30 extends through the central cutout of bracket 40. Since its main purpose is to add rigidity to the structure, bracket 40 is preferably fabricated from steel, whose thickness is preferably at least about 2 mm thick.

In instances of severely non-planar walls, flange 30 may not extend into the wall over its entire length. Any gap that remains between the rear edge of flange 30 and the wall can be readily filled with a filler (such as spackle) paste.

Figure 4:
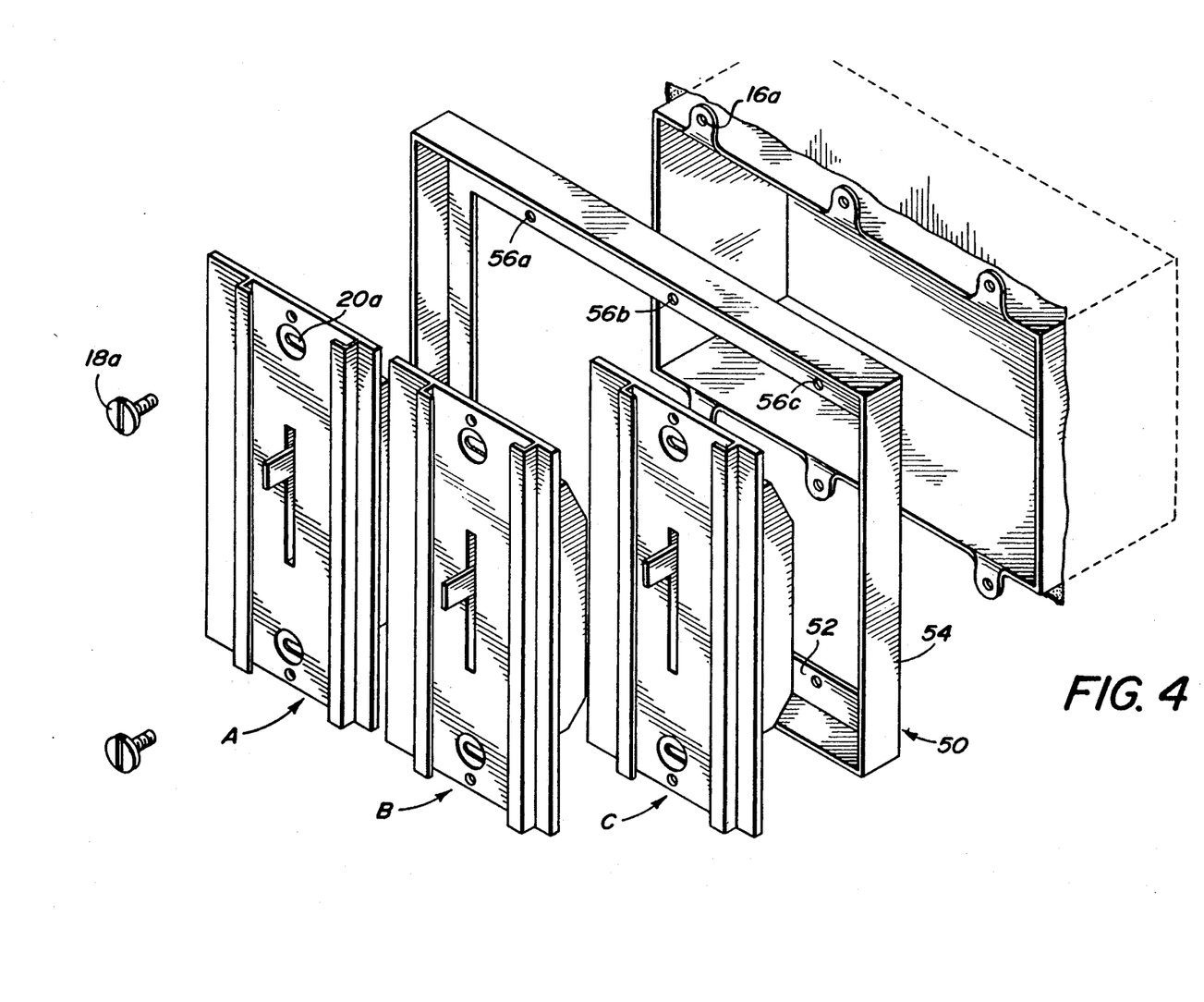
FIG. 4 is an exploded perspective view of a third embodiment of this invention.

FIG. 4 depicts an alternative embodiment of a mounting frame of this invention. Frame 50 includes a planar section 52 and a flange 54, which extends along the outside edges of frame planar section 52. Flange 54 is substantially normal to the plane of section 52. It extends away from the wall when the frame is mounted, its width preferably corresponding to the combination of yoke thickness and faceplate mounting element height. Note that unlike flange 30 (FIG. 1), flange 54 would be clearly visible at the perimeter of the multigang installation, and the appearance of its outside surface would be an important element in the overall aesthetics.

As shown in FIG. 4, planar section 52, is not in the path of the mounting screws, such as 18a. Alternatively, section 52 may be wider, requiring it to have clearance holes or slots (not shown) to be aligned with yoke slots (such as 20a) and tapped mounting holes (such as 16a). Preferably, frame 50 has alignment markers such as 56a on section 52 to facilitate aligning devices A, B, and C. The alignment markers may be protuberances on section 52. Generally, devices A, B, and C can be wired into switchbox 10 and then pushed out through frame 50 to be in place for mounting. An alternative installation procedure is possible if there is a gap (not shown) in frame 50. In that case the wires that join the devices to the switchbox can simply be passed through the gap. The gap obviously reduces the rigidity of frame 50, which is a drawback of this design.

To provide adequate rigidity, frame 50 is preferably fabricated from steel, having a thickness that is preferably at least about 0.5 mm thick. For enhanced rigidity, a strengthening bracket (element 40 in FIG. 3) could be used with the embodiment of FIG. 4. The bracket could be either between frame 50 and switchbox 10 or between section 52 and the yokes. If the latter position is used, the width of flange 54 would be increased, so that its front edge is still aligned with the front of the faceplate mounting elements 26a, 26a', 26b', etc. As is the case with planar section 52 of frame 50, the bracket would require clearance holes if its width put it in the path of the mounting screws. A narrower (and, correspondingly, thicker) bracket would not require clearance holes.

Figure 5:
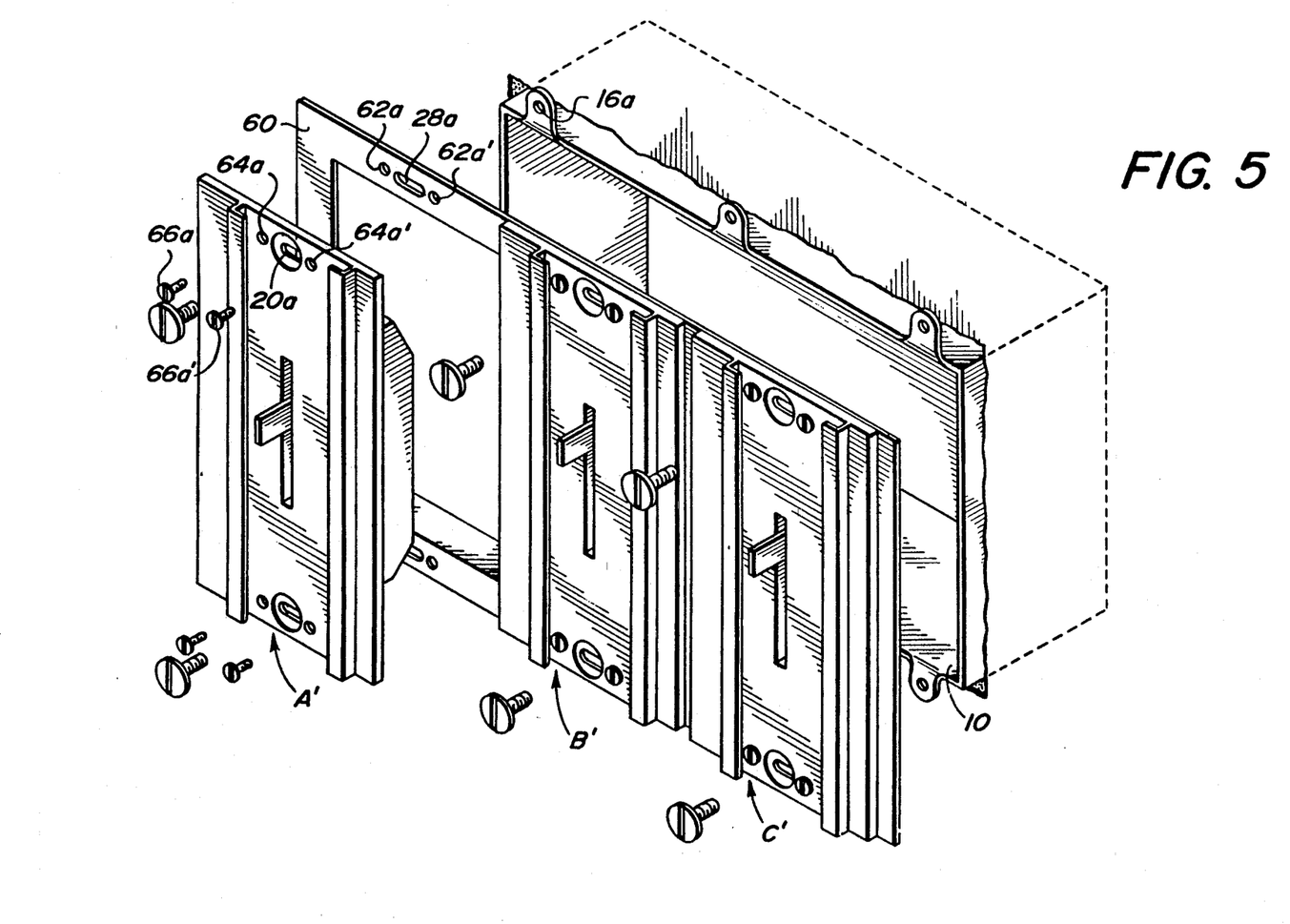
FIG. 5 is an exploded perspective view of a fourth embodiment of this invention.

FIG. 5 depicts another embodiment of the present invention, in which support frame 60 includes slots such as 28a for alignment with slots such as 20a and threaded holes such as 16a. These slots and holes permit mounting of devices such as A' in switchbox 10. In addition, frame 60 includes tapped holes such as 62a and 62a', and the yokes of devices A', B', and C' have clearance holes, such as 64a and 64a'. These added holes permit the devices to be mounted onto frame 60, with screws such as 66a and 66a'. The embodiment of the mounting frame that is depicted in FIG. 5 makes it easier to mount multigang installations, because the devices may first be mounted onto frame 60 and then the entire assemblage of devices may be installed in switchbox 10. That procedure is not possible with the frame embodiments depicted in FIGS. 1, 3, and 4, because the same screws are used to mount the devices and the frame to the switchbox. Another attribute of the embodiment of FIG. 5 is that the device yokes and frame 60 are in intimate contact over a large area, which can enhance heat transfer from the devices and avoid overheating.

Figure 6:
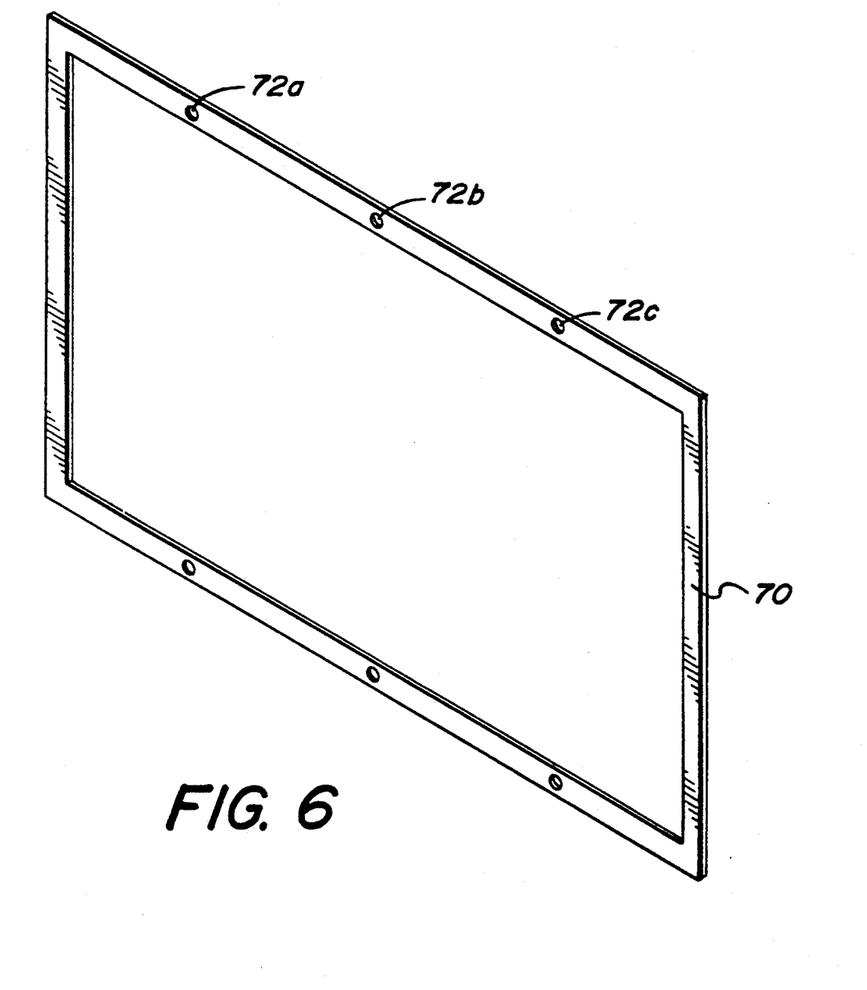
FIG. 6 depicts an alignment frame of the present invention.

FIG. 6 depicts an alignment guide 70, which can be used in place of a frame, such as element 22 in FIG. 1, when wall 12 is planar and switchbox 10 is properly mounted. The sole purpose of guide 70 is to align devices for multigang mounting. Markers 72a, 72b, and 72c guide the juxtaposition of devices A, B, and C that will ensure the alignment needed for mounting a snap-on faceplate. The markers may be on the surface of guide 70 or protuberances that protrude from the surface. Note that guide 70 becomes part of the multigang installation, and, therefore, is preferably thin, so as to minimally affect the aesthetics of the installation. An interlocking structure, like that depicted in FIG. 1A, is suitable for guide 70 and has the advantages discussed earlier.

Since certain changes may be made in the above apparatus without departing from the scope of the inventions herein involved, it is intended that all matter contained in the above description or shown in the accompanying drawing shall be interpreted in an illustrative and not in a limiting sense.

We claim:

1. A frame for mounting a plurality of adjacent electrical devices into a switchbox which is mounted into a wall, said wall having a non-planar surface relative to said switchbox, said frame comprising, in combination:

(a) a substantially rectangular first plate formed of a rigid material, said first plate having a front surface, a back surface which abuts against said wall, and a substantially rectangular opening, said first plate further comprising a plurality of holes in said first plate, positioned to permit alignment with holes in said switchbox;

(b) a flange extending substantially normal to said first plate at an outer edge of said plate; and (c) a strengthening bracket, comprising a substantially rectangular second plate, for placement against a surface of said first plate, said second plate having
  (i) a substantially rectangular opening and
  (ii) a plurality of holes positioned to permit alignment with said holes in said first plate whereby said frame effectively changes said non-planar surface of said wall to a planar mounting surface.

* * * * *